(12) United States Patent
Soderholm et al.

(10) Patent No.: US 8,741,237 B1
(45) Date of Patent: Jun. 3, 2014

(54) SOLVENT EXTRACTION SYSTEM FOR PLUTONIUM COLLOIDS AND OTHER OXIDE NANO-PARTICLES

(75) Inventors: Lynda Soderholm, Lemont, IL (US);
Richard E. Wilson, Oak Park, IL (US);
Renato Chiarizia, Elmhurst, IL (US);
Suntharalingam Skanthakumar, Bolingbrook, IL (US)

(73) Assignee: U.S. Department of Energy, Washington, DC (US)

(*) Notice: Subject to any disclaimer, the term of this patent is extended or adjusted under 35 U.S.C. 154(b) by 841 days.

(21) Appl. No.: 12/758,106

(22) Filed: Apr. 12, 2010

(51) Int. Cl.
*B01D 11/00* (2006.01)

(52) U.S. Cl.
USPC .................................................. 423/8

(58) Field of Classification Search
USPC .................................................. 423/8
See application file for complete search history.

(56) References Cited

U.S. PATENT DOCUMENTS

| | | | | |
|---|---|---|---|---|
| 4,772,429 | A * | 9/1988 | Descouls et al. | 252/625 |
| 2007/0290178 | A1* | 12/2007 | Baron et al. | 252/643 |
| 2011/0127473 | A1* | 6/2011 | Hanus et al. | 252/643 |

FOREIGN PATENT DOCUMENTS

| | | | |
|---|---|---|---|
| JP | 2001318076 A | * | 11/2001 |
| WO | WO2010/012886 | * | 4/2010 |

OTHER PUBLICATIONS

K. Juznic, S. Fedina, M. Senegacnik Extraction of Plutonium From Sulphuric acid by TOA in toluene Jounrnal of Radioanalytical Chemistry, vol. 30 (1976) p. 419-424.*
Zhenyu Li, Wei Qin, and Youyuan Dai Liquid-Liquid Equilibria of Aquesous Acetic Acid Derivatives with Trioctylamine and Select Organic Diluents J. Chem. Eng. Data 2003 48 p. 1113-1119.*
http://www.chemical-ecology.net/java/solvents.htm Aug. 10, 2006 Publication date of the webside is included in www.chemical-ecology.pdf file.*

* cited by examiner

*Primary Examiner* — Jie Yang
*Assistant Examiner* — Jenny Wu
(74) *Attorney, Agent, or Firm* — Jacob A. Heafner; Brian J. Lally; John T. Lucas

(57) ABSTRACT

The invention provides a method for extracting plutonium from spent nuclear fuel, the method comprising supplying plutonium in a first aqueous phase; contacting the plutonium aqueous phase with a mixture of a dielectric and a moiety having a first acidity so as to allow the plutonium to substantially extract into the mixture; and contacting the extracted plutonium with second a aqueous phase, wherein the second aqueous phase has a second acidity higher than the first acidity, so as to allow the extracted plutonium to extract into the second aqueous phase. The invented method facilitates isolation of plutonium polymer without the formation of crud or unwanted emulsions.

16 Claims, 3 Drawing Sheets

SOLVENT EXTRACTION SYSTEM FOR PLUTONIUM COLLOIDS AND OTHER OXIDE NANO-PARTICLES

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to a system for extracting plutonium from liquid phases, and more particularly, this invention relates to a system for extracting plutonium colloids and other oxides from spent nuclear fuel via liquid-liquid extraction comprising an organic and an aqueous phase extraction.

2. Background of the Invention

During the dissolution and reprocessing of spent nuclear reactor fuel, various phases of plutonium and other metals are formed, usually in the initial aqueous phase, i.e., the aqueous feed stock solution. One of the plutonium phases is referred to as "plutonium polymer."

The problems associated with the formation of the polymers include clogging of stripping towers and liquid transfer lines. This creates criticality issues as well as the loss of material balance across plant operations. Ultimately, proliferation risks increase.

One solution to this polymer problem is to prevent formation of the polymer during fuel reprocessing. An alternative is to develop a solvent extraction system which targets removal and recovery of the plutonium fraction present in the polymeric phase.

Solvent extraction of plutonium polymer has been attempted with extractants such as tributyl phosphate (TBP). For example, Chaiko *Separation Science and Technology* 27 (11) pp 1389-1405 (1992), discloses a protocol for precipitating plutonium, with back extraction achieved using silica. However, the formation of precipitated plutonium raises proliferation and criticality issues.

Some extraction methods incorporate other organophosphorus extractants (e.g. phosphine-oxides). These methods typically extract all forms of plutonium, including plutonium-4, plutonium-6 and plutonium-polymer. Therefore, selectivity is nill. Also, these methods produce phosphate-containing secondary waste streams, which if incinerated, create environmental and final waste disposal issues.

Other extraction protocols eliminate the aforementioned environmental problems by using phosphate-free solvents. One such protocol is disclosed in Cuillerdier et al., *Separation Science and Technology* 26(9) pp 1229-1244 (1991). However, such non-phosphate systems lack selectivity and reversibility features.

In summary, state of the art plutonium extraction systems lack efficiency. Stripping of polymer is difficult, resulting in plutonium remaining in the organic phase. In situations where the polymer is successfully back-extracted from the organic phase, "crud" and emulsions form, neither of which is compatible with fuel reprocessing.

Most extraction technologies target molecular and/or ionic moieties of plutonium while not addressing colloidal plutonium. Molecular/ionic species of target metals consist of coordination complexes such as oxo-acid, halide, and aquated complexes, for example, $Pu(NO_3)_4$, $Pu(NO_3)_6^{2-}$, $UO_2(NO_3)_2$ etc where only one metal ion is contained in the solvated complex. These species are originally generated in the aqueous phase by adjustment of the aqueous phase conditions. They are then extracted into the organic phase using the desired complementing extractant.

Colloidal or polymeric complexes on the other hand, consist of multiple metal or actinide atoms in the complex. They may coexist with molecular and ionic forms in the aqueous phase feedstock solution. This multiple atom feature of polymeric complexes presents challenges for metal extraction.

A need exists in the art for a system to extract colloidal plutonium whereby the extracted plutonium can be easily isolated for final disposition. The system should utilize relatively inexpensive reactants and result in no production of secondary waste streams. The system also should be compatible with existing plant operations, for example being operable in low (two molar or less) acid conditions.

SUMMARY OF INVENTION

An object of the invention is to provide a system to extract plutonium and other metals from nuclear waste that overcomes many of the drawbacks of the prior art.

Another object of the invention is to provide a system for extracting plutonium colloids from ionic plutonium and molecular plutonium feedstocks. A feature of the invention is leveraging the lability of plutonium colloid surfaces so as to facilitate first the complexation of plutonium colloids with amphiphilic extractants, and then the subsequent complexation of the colloids with relatively higher acidic aqueous based moieties. An advantage of the invention is the elimination of cruds and other emulsions which otherwise disrupt nuclear fuel processing operations.

Yet another object of the present invention is providing a system for extracting plutonium colloids and other oxide nanoparticles from spent nuclear fuel. A feature of the invention is the use of carboxylic acids and common organic solvents as an extractant mixture. An advantage of the invention is the use of lower acidity compared to state of the art systems, and therefore the associated lower costs associated with the use of the invented process.

Briefly, the invention provides a method for extracting plutonium from spent nuclear fuel, the method comprising supplying plutonium in a first aqueous phase; contacting the plutonium aqueous phase with a mixture of a dielectric (e.g. a polar organic diluents) and a moiety having a first acidity so as to allow the plutonium to substantially extract into the mixture; and contacting the extracted plutonium with a second aqueous phase, wherein the second aqueous phase has a second acidity higher than the first acidity, so as to allow the extracted plutonium to extract into the second aqueous phase.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The inventors have elucidated a new mechanism and confirmed a new structure of plutonium colloid which has led to the development of the instant extraction system. The inventors have determined the following reaction mechanisms which produce the new colloid:

$$Pu^{4+}+H_2O \rightarrow PuOH+H^+ \qquad \text{Equation 1}$$

$$PuOH \rightarrow Pu\!-\!O\!-\!Pu+H_2O \qquad \text{Equation 2}$$

wherein Equation 1 depicts hydrolysis of $Pu^{4+}$ to generate plutonium hydroxyl species and hydrogen ions, and Equation 2 depicts oxalation of the plutonium hydroxyl to obtain the basic structure. It is the surface lability of this basic structure that is supplied as a first step in the invented separation protocol.

The invented separation protocol is applicable to other oxidic colloids of cerium, thorium, and zirconium. The invented separation protocol is selective for colloidal particles over mononuclear and ionic solvated species.

Surface Lability
Detail

The inventors have determined that the structure of the colloidal plutonium is crystalline $PuO_2$ with a well defined surface and consequently a well defined chemistry. Specifically, the inventors have found that plutonium colloid comprises the $PuO_2$ core with a unique surface stoichiometry of anions and water. (See FIG. 1A.) Surprisingly and unexpectedly, the inventors discovered the reactivity of the surface of the core when they observed the core display different colors depending on the fluid in which the core resided. This demonstrated that the surface of these particles was reactive towards ion-exchange reactions without disturbing the fundamental $PuO_2$ core.

Figure 1:
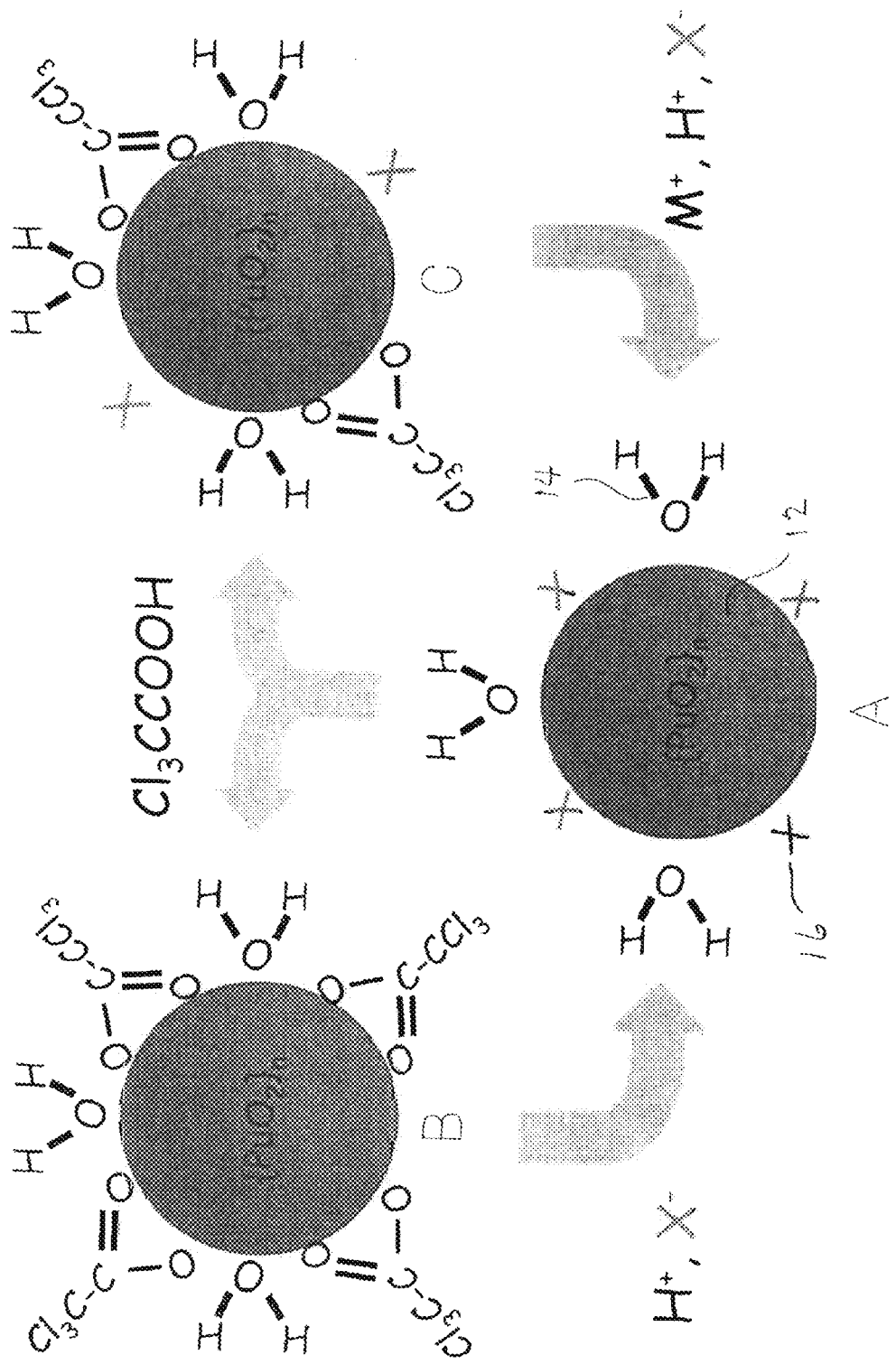
FIG. 1 depicts various plutonium polymer complexation mechanisms, in accordance with features of the present invention.

FIG. 1A shows that the surface of the colloidal or polymeric particles is populated by water and mineral acid anions representative of the electrolyte from which it is produced. A feature of the invented protocol is replacing these inorganic anionic ligands with amphilphilic extractants to facilitate spontaneous transfer of these charged nanoclustered species into an immiscible organic solvent.

The basic form of the plutonium, prior to application of the invented extraction protocol, is colloidal or polymeric plutonium. Several other sizes of the colloids exist, all based on the same oxidic core. The inventors have determined that the fundamental cluster comprises from 6 to 100 plutonium atoms. The solvent extraction described herein is effective for all sizes of the polymer including those prepared in nitric acid media. Acid concentrations of from about 10 M (moles per liter) (i.e. pH −1) to 0.001 moles per liter (pH 3) are suitable wherein pH is taken here in its typical sense, i.e., pH is the -log of the proton concentration. Preferably at pH values greater than 3, additional salts are added to the system to prevent crud formation and precipitation.

UV-visible absorption spectrophotometry demonstrated that upon changing of the solution anion concentration of the plutonium-containing liquor, the color of the solution changed. The color changes observed were reversible and instantaneous. Furthermore, the color is exhibited by the fluid phase in which the plutonium resides such as to provide a means for determining when transferance of plutonium polymer from an organic phase to an aqueous phase occurs. For example, if the plutonium initially resides in organic phase, that organic phase may be green. When the plutonium is extracted into the aqueous phase, the organic phase loses its green color, and the aqueous phase instead acquires the green color.

It should be appreciated that given the lability of the surface of the plutonium particle, said lability discovered by the inventors, the color of the plutonium-containing phase will change, depending on the reactants utilized. For example, the inventors found that when a high concentration of chloride ions are present in the plutonium-containing phase, the phase is red. When a high concentration of water is present in the plutonium-containing phase, the phase is green. As such, solution color can be used in the instant protocol as a means to determine the constituency of the plutonium-containing phase. Any color change may provide impetus for follow-up quantitative identification of each phase constituent (e.g., using UV-vis absorption spectrophotometry) whereby the characteristic absorption spectrum of each constituent provides both identification and quantity of the constituent present. This technique is significantly more sensitive than the naked eye test.

Building upon the aforementioned structural data and determinations, the kinetics of the absorption spectroscopy revealed that the surface anions were labile and could be substituted for other anions after the cluster formation. This revelation by the inventors resulted in the invented protocol to manage the cluster fraction of target metal in the aqueous feed stock.

The invention provides a protocol to first replace inorganic anionic ligands, normally adhering to the surface of plutonium polymer in aqueous phase, with amphiphilic extractants. This replacement enhances extraction of polymer into organic phase. The surface of the now extracted polymer is again modified such that an acid, stronger than the amphililic extractant, replaces the extractant on the polymer surface, thereby causing removal of the polymer from the organic phase to a second aqueous phase.

Specifically, the surface of these particles participate in ion-exchange reactions without disturbing the $PuO_2$ core, such that the nanoclusters once extracted into the aforementioned organic solvent, can be subsequently extracted into an aqueous phase upon contacting the first extracted nanoclusters with a moiety, more acidic in the Bronsted-Lowry sense, than the amphiphilic extractants.

The surface of the colloidal or polymeric particles is populated by water and mineral acid anions, the latter of which originates from the electrolyte used to form the polymer. FIG. 1A depicts such a $PuO_2$ particle before association with extractant. "X" represents the mineral acid anion. The origin of the mineral acid ion is that acid utilized in the initial decladding, and harvesting operations of the spent nuclear fuel.

FIG. 1B depicts an embodiment of the invention whereby the $PuO_2$ particle is complexed with carboxylic acid moiety.

FIG. 10 depicts the PuO$_2$ particle complexed with carboxylic acid moiety and mineral acid anion.

In this embodiment of the invention, the amphiphilic moiety trichloroacetic acid (TCA) in an n-octanol solvent is used in a first step to perform the extraction of the plutonium polymer from the harvesting liquor. Other solvents have been employed with success including butanol and hexanol. The trichloroacetic acid coordinates to the surface of the plutonium colloids in its anionic deprotonated form. The inventors have found that this process is reversible by ligand competition from a more strongly coordinating anion such as sulfate, carbonate, phosphate, iodate and combinations thereof.

Reactant Detail

A myriad of extractants are suitable, including the carboxylate genus of compounds. Haloacids of carboxylates, such as TCA, dichloracetic acid, monochloro and halo-acids with longer alkane chains are preferable. Combinations of these extractants are also suitable.

In one embodiment of the system, the extraction employs trichloroacetic acid (TCA) in an octanol solvent. Other suitable solvents include methylisobutyl ketone, diisobutyl ketone, diethyl ether, diisopropyl ether, dibutyl ether, dibutylcarbitol, butyl acetate, isobutyl acetate, and combinations thereof. Generally, octanol or any immiscible alcohol is sufficiently polar (sufficient dielectric) that it can solvate the TCA-plutonium complex. Generally suitable solvents to the extractant include alcohols having greater than 4 carbons. Preferred alcohols include, but are not limited to butanol, pentanol, hexanol, and heptanol. FIGS. 1B and 1C show the trichloroacetic acid coordinated to the surface of the plutonium colloids in its anionic deprotonated form.

Plutonium polymer is originally present in an aqueous phase containing the plutonium polymer and a dilute mineral acid. The mineral acid concentration necessary for extraction may be as low as pH 3 without the addition of salts to prevent crud formation and precipitation. Initial cluster formation is dependent upon the acid concentration of the system and may occur at a pH as low as 1. The aqueous phase containing the polymer is contacted with an immiscible organic phase containing an alcohol such as octanol and trichloroacetic acid. The two phases are mixed and then separated.

The carboxylic acid is partitioned between both phases but the overwhelming majority of the acid remains in the organic phase. Partition studies by the inventors have shown that about 60-70% of the TCA remains in the organic phase. The plutonium polymer fraction is now in the lighter organic phase.

The mechanisms for the chemistry are outlined below.

Extraction—Extraction occurs by surface coordination of TCA to the plutonium polymer surface. Equation 3 represents the chemistry for the extraction.

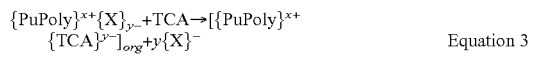

$\{PuPoly\}^{x+}\{X\}^{y-}_y + TCA \rightarrow [\{PuPoly\}^{x+}\{TCA\}^{y-}]_{org} + y\{X\}^-$   Equation 3 wherein PuPoly designates the plutonium polymer, X is the mineral acid anion, and TCA is trichloroacetic acid.

In the scheme depicted in Equation 3, the anions of the mineral acid or electrolyte are fully displaced from the polymer surface and replaced by TCA allowing for solvation in the organic alcohol phase.

Alternatively, incomplete replacement/substitution of the anions may occur, per Equation 4, below, while still allowing for extraction.

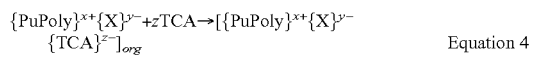

$\{PuPoly\}^{x+}\{X\}^{y-} + zTCA \rightarrow [\{PuPoly\}^{x+}\{X\}^{y-}\{TCA\}^{z-}]_{org}$   Equation 4

Extractant Reclamation
Detail

The extraction process is reversible by ligand competition from a more strongly coordinating anion such as sulfate. In this case, an organic phase to which the plutonium polymer has been extracted is contacted with an aqueous phase containing a sulfate salt solution. After phase separation the plutonium polymer has been transferred from the organic to the aqueous phase, as depicted in Equation 5, below.

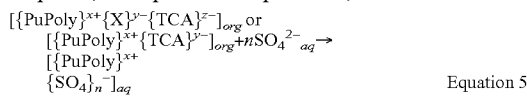

$[\{PuPoly\}^{x+}\{X\}^{y-}\{TCA\}^{z-}]_{org}$ or
  $[\{PuPoly\}^{x+}\{TCA\}^{y-}]_{org} + nSO_4^{2-}_{aq} \rightarrow$
  $[\{PuPoly\}^{x+}$
  $\{SO_4\}_n^-]_{aq}$   Equation 5

Figure 2:
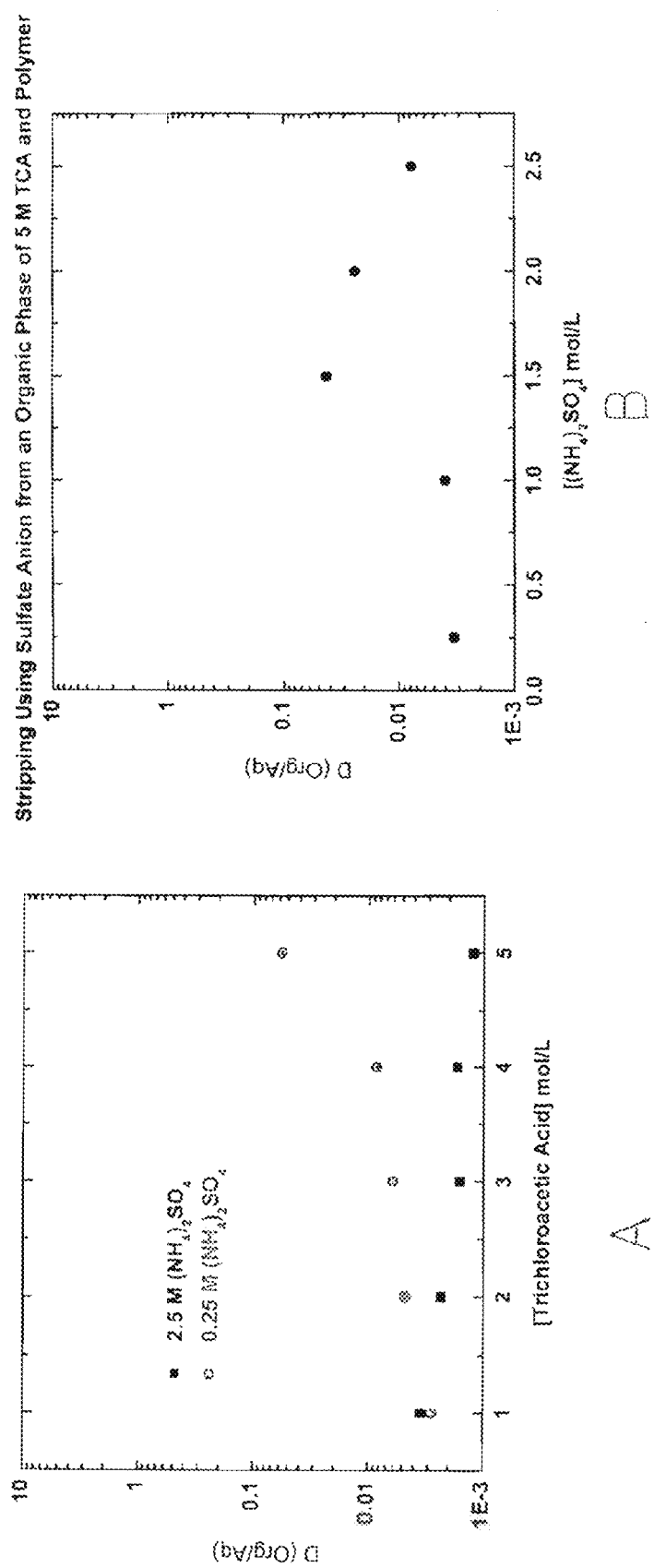
FIG. 2 depicts two graphs depicting the sulfate anion efficiency in stripping extractant liquor from metal colloid.

FIG. 2 shows two graphs depicting the effectiveness of sulfate as a stripping agent for TCA reclamation. FIG. 2A exhibits how sulfate ion substantially completely inhibits complexation of TCA. FIG. 2B demonstrates the stripping ability of sulfate ion in an organic phase of 5 molar TCA complexed with plutonium polymer. The graph in FIG. 2B shows high sulfate complexation with plutonium polymer at from about 0.25 to 2.5 mols of sulfate per liter of extractant liquor. Experiments by the inventors have developed a spectro-chemical series trend as follows:

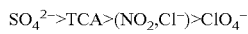

$SO_4^{2-} > TCA > (NO_2, Cl^-) > ClO_4^-$

Other suitable stripping anions include, but are not limited to, fluoride, oxalate, dihydrogenphosphate, methyldiphosphonate, 1-hydroxyethane-1,1-diphosphonate, and combinations thereof.

Figure 3:
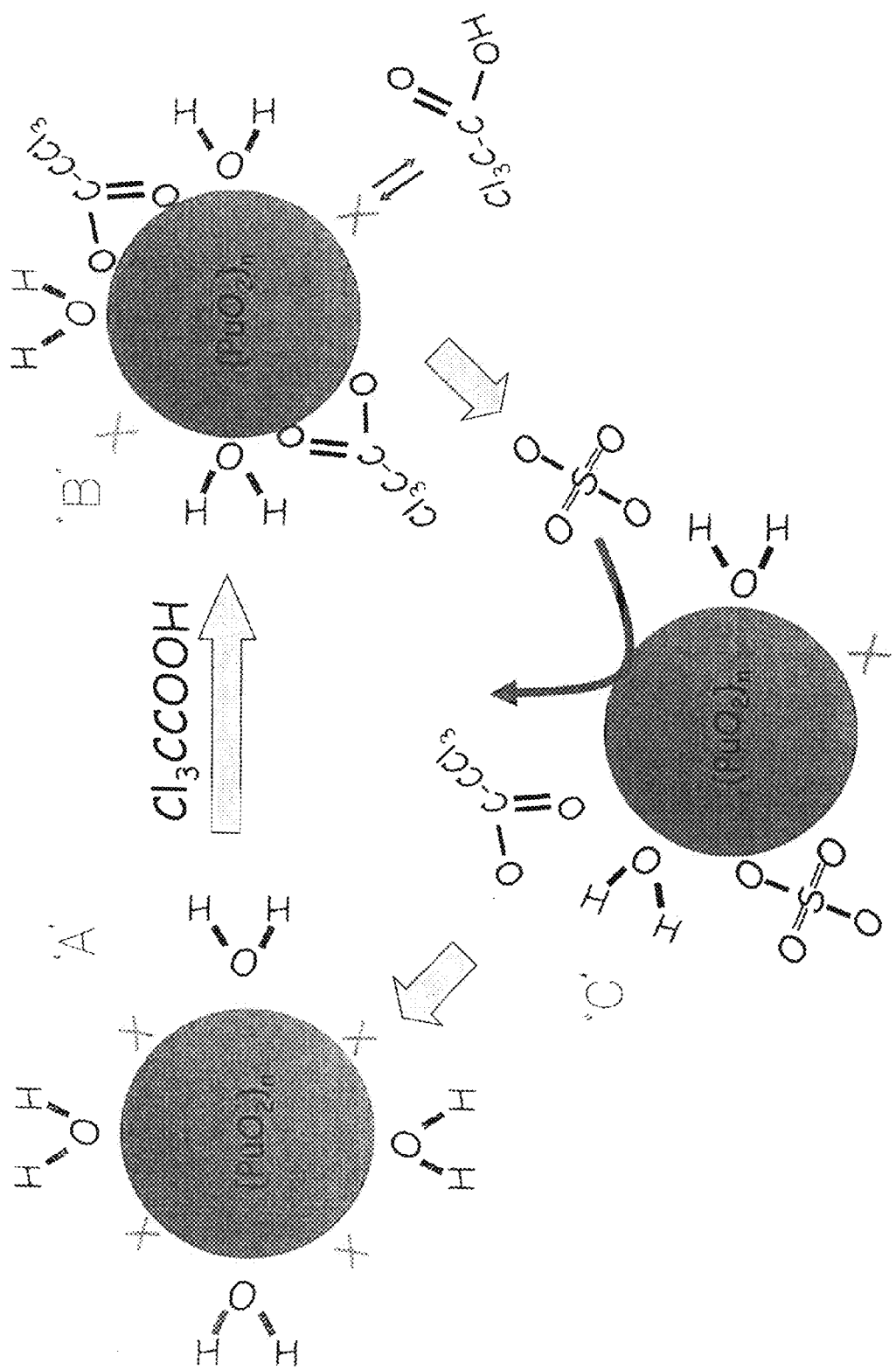
FIG. 3 is a schematic depiction of the stripping mechanism of sulfate ion, in accordance with features of the present invention.

FIG. 3 is a schematic diagram of the complete complexing, decomplexing mechanism. In a first step, FIG. 3A, plutonium is supplied as part of decladded nuclear fuel. The inventors have determined that several forms of plutonium polymer exist, all based on the same oxidic core. The solvent extraction described herein is effective for all sizes of the polymer including those prepared in nitric acid media as described by Costanzo et al., *J. Inorg. Nucl. Chem.* 1973, Vol 35, pp 609-632, incorporated herein by reference.

This plutonium colloid feedstock is mixed with an aqueous/organic mixture, the salient portion of the mixture being an amphiphilic moiety such as TCA (designated in the drawing as Cl$_3$CCOOH) and a dielectric, e.g. octanol. The resulting complex is shown in FIG. 3B.

As depicted in FIG. 3C, the plutonium is back extracted using a competing anion such as sulfate to return the polymer back to the aqueous phase, sans any crud or emulsion byproduct which has plagued previous separation protocols.

The following is an example of the invented protocol in operation: A feedstock of plutonium containing colloidal or polymeric plutonium in an aqueous solution with a mineral acid concentration of 10 to 0.001 M and an ionic strength of not less than 0.1 M, at 25° C. is provided. This aqueous feedstock is contacted with an immiscible organic phase containing 5 M to 0.1 M trichloroacetic acid dissolved in n-octanol, or other alcohol, ketone or ether as described supra.

The two phases are mixed using a vortexing mixer or manual shaking for a time sufficient to cause complete mixing and extraction, usually not less than 30 seconds. Separation of the two phases maybe accomplished by centrifugation or settling over time. The organic phase now contains the plutonium polymer. The quantity of the plutonium transferred to the organic phase may be quantified by UV-visible absorption spectrophotometry and, where the total plutonium concentration lies below the sensitivity of this analytical technique, by radiometric counting using either alpha-, gamma-, or liquid scintillation counting.

To reverse the extraction process or "strip" the colloidal plutonium from the organic phase, the plutonium polymer containing organic phase may be contacted with an aqueous phase containing a sulfate salt or acid in the concentration of 2.5 to 0.025 M, by the same mixing and phase separation techniques as above. Quantification of the reverse process may be carried out using the methods mentioned in the preceding paragraph.

Optimal operating conditions for this procedure to maximize phase transfer, minimize and eliminate crud or solid phase formation encompass the following chemical conditions.

1. The plutonium feedstock shall consist of a solution of plutonium up to 0.100 M in total plutonium containing either entirely polymeric or a mixture of polymeric and molecular plutonium complexes in 1 M nitric acid solution at 25 C.

2. The organic phase for the extraction shall consist of 1 M trichloroacetic acid in n-octanol, or some other solvent, again as discussed herein, in a volume approximately equal to that of the aqueous phase.

3. Mixing the phases is accomplished by the use of a vortexing mixer for a time sufficient to substantially cause extraction. Usually, vortexing is performed for no less than 30 seconds, then followed by centrifugation until separation of phases is substantially complete.

4. Reversal of the solvent extraction process is accomplished by contacting an organic phase containing the colloid rich trichloroacetic acid, n-octanol liquor with an aqueous phase containing up to 2.5 M moles per liter of any sulfate salt or sulfuric acid and not less than 0.025 moles per liter of a sulfate salt or sulfuric acid.

5. Mixing of the phases for the reverse process is similar to that in 3 above.

6. Quantification of the phase transfer or extraction can be accomplished by UV-Vis absorption spectrophotometry or by radiometric counting using alpha-, gamma-, or liquid scintillation-counting.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A method for extracting plutonium from spent nuclear fuel, the method comprising:
   a. supplying plutonium in a first aqueous phase;
   b. mixing the plutonium first aqueous phase with a mixture of a polar organic compound and a moiety creating a first organic mixture having a first acidity as to allow the plutonium to substantially extract into the first organic mixture; and c. mixing the extracted plutonium with a second aqueous phase, wherein the second aqueous phase has a second acidity higher than the first acidity, so as to allow the extracted plutonium to extract into the second aqueous phase;
   d. selecting the polar organic compound as a molecule selected from the group consisting of n-octanol, hexanol, butanol, and combinations thereof, and wherein the moiety is a halocarboxylic acid.

2. The method as recited in claim 1 wherein the halocarboxylic acid is selected from the group consisting of monochloroacetic acid, dichloroacetic acid, trichloroacidic acid, and combinations thereof.

3. The method as recited in claim 1 wherein the second aqueous phase contains a moiety selected form the group consisting sulfate, carbonate, phosphate, iodate, and combinations thereof.

4. The method as recited in claim 1 wherein the method is carried out at ambient temperature and pressure.

5. The method as recited in claim 1 wherein no external heat is added.

6. The method as recited in claim 1 wherein the plutonium is colloidal plutonium and wherein the extraction of the plutonium into the second aqueous phase is indicated by a transfer of color from the first organic mixture to the second aqueous phase.

7. The method as recited in claim 1 wherein the plutonium is plutonium polymer having the formula $PuO_2$.

8. The method as recited in claim 1 wherein a pH of the first organic mixture ranges from between approximately −1 and 3.

9. A method for extracting plutonium from an aqueous solution containing plutonium, the method comprising:
   a. mixing the aqueous solution with an organic liquor containing n-octanol and trichloroacetic acid for a time sufficient to cause the plutonium to move to the organic liquor; and
   b. mixing the organic liquor with an aqueous liquor containing sulfate moiety for a time sufficient to cause the plutonium to move into the aqueous liquor.

10. The method as recited in claim 9 wherein the aqueous solution contains nitric acid.

11. The method as recited in claim 9 wherein no external heat is added.

12. The method as recited in claim 9 wherein no external pressure is added.

13. The method as recited in claim 9 wherein the sulfate is present in a concentration of from about 0.025 to 2.5 M.

14. The method as recited in claim 9 wherein the plutonium is present up to about 0.100 M in aqueous solution.

15. The method as recited in claim 9 wherein the nitric acid is present at a concentration of between about 0.001 M and 10 M.

16. The method as recited in claim 9 wherein the aqueous solution is at a pH of between approximately −1 to 3.

* * * * *